(12) United States Patent
Palmer

(10) Patent No.: X9290
(45) Date of Patent: Dec. 15, 1835

(54) CISTERN, WATER, &C.

(76) Inventor: Alfred Palmer

United States Patent

Patent No.: X9290

Alfred Palmer, of Syracuse, New York,

Letters Patent.

The schedule referred to in these Letters Patent and making part of the same containing a description in the words of the said Alfred Palmer himself of his improvement in the construction of Water and other Cisterns To all to whom these presents shall come Be it known that I Alfred Palmer, of Syracuse in the County of Onondaga & State of New York, have invented a new and useful improvement upon the invention of George Tibbets, Junior in the construction of Cisterns Patented December 30th 1833, and that the following is a full and exact description thereof, viz.

Let a circular or other shaped pit be dug. of suitable size, then place within it a tube or curb of from one to eight or more feet in height as is most convenient within this tube or curb, make the ~~[illegible]~~ bottom of the cistern by spreading a stratum of mortar of water, lime, and sand on the bottom of the pit, upon which & within the tube or curb above mentioned, place another tube or curb of similar form, and of so much less size as to leave a space between the tubes or curbs of from one to 8 inches, or more, as may be thought proper, fill this space with mortar or cement of water, lime, and sand, or with water, lime, sand & water, and other substances, as stone, gravel, brick, or clam or oyster shells, (always being careful to have the space well filled with the cement, of water, lime, sand, and water. This done let the tubes or curbs stand until the mor-ter or cement is sufficiently hard, to stand of itself; then take out the outside tube or curb, and pack in the earth in its place so as to fill the space between the outside of the pit & the morter or cement. Or if thought proper the outside tube or curb be-ing made narrow, may be raised a little at a time during the filling the space between the tubes or curbs, the earth in the mean time being packed around the out-side of it to keep the morter or cement in its place, and thus continued until the spaces are filled; after these spaces are filled the inside tube or curb may be taken out & the inside of the cistern may then be smoothed, over by means of a brush or trowel, & then covered & allowed to stand a few days, before used,
The curbs or tubs may be in two, three, or more pieces, for the sake of conve-
-nience in filling the space between them, and be made of wood, iron, or other
suitable material. What I claim as my own invention in the mode
of constructing cisterns, above described is the taking out the tubs or curbs and
leaving the cistern of solid cement or other hard substance, the out & inside
being partially smooth, & free from the inconvenience of perishable materials
and of cleaning off of the plastering.

Witnesses
Isaac W. Brewster. }
Hiram Gilbert. }

Alfred Palmer,

540 [illegible]

Exd

[illegible] Drawing not made as this is Identical with that of George [illegible]
(See drawing in Portfolio) dated Decr 30th 1833 -